UNITED STATES PATENT OFFICE.

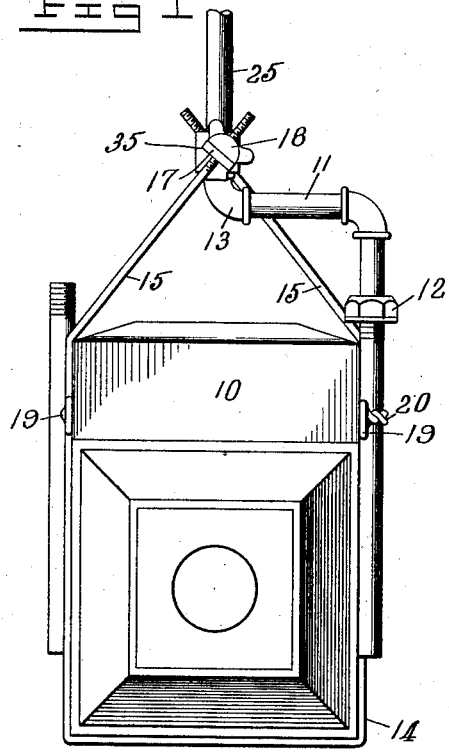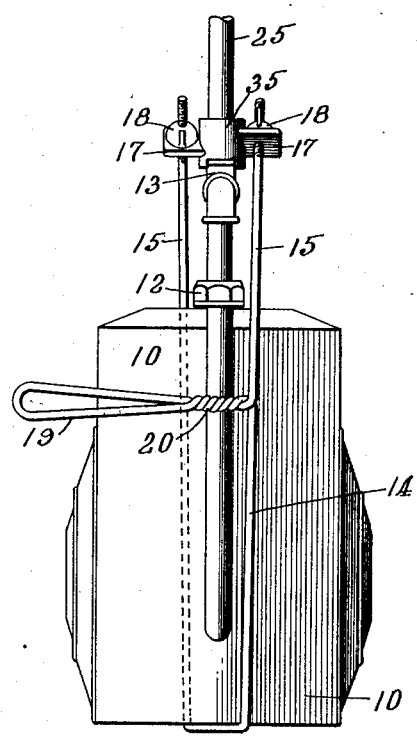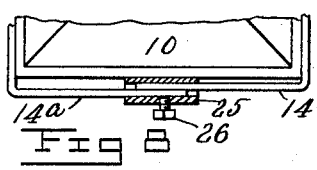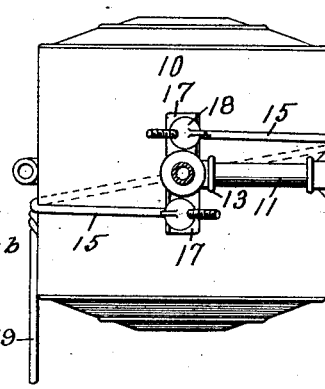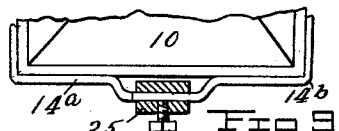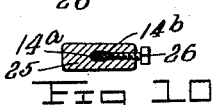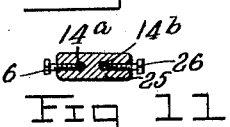

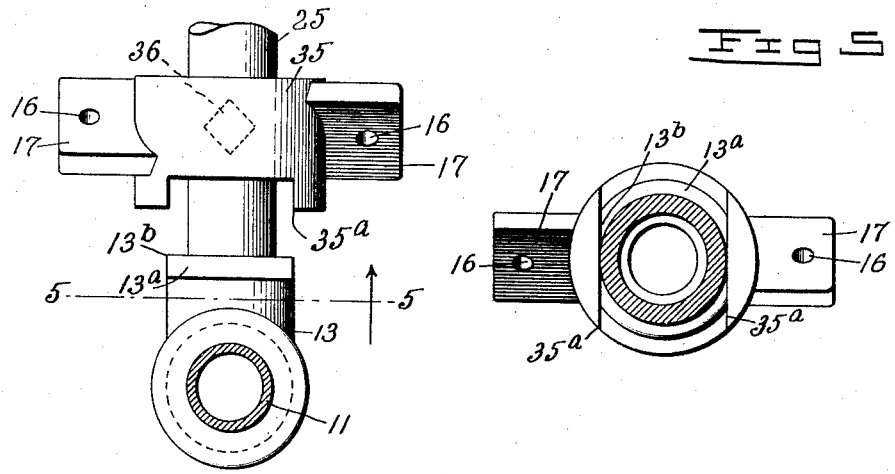

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

METER-HANGER.

1,006,397. Specification of Letters Patent. Patented Oct. 17, 1911.

Application filed July 22, 1910. Serial No. 573,325.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Meter-Hangers, of which the following is a specification.

Our invention relates to improvements in means for supporting meters in position when connected to the service and street pipes, and has more particular relation to devices for this purpose which serve in the nature of a hanger.

So far as we are aware, it is the general practice in providing supports for a meter to make such support in the form of a shelf secured to the wall, and upon which the meter is adapted to rest. While such devices are of practical utility, they necessitate the provision of means for securing the shelf to the wall with sufficient strength to resist the weight of the meter, there being always present the liability of loosening of such connection with the wall, and thereby placing the support of the meter entirely upon the connections between the pipes and the meter secured thereto. Another difficulty in connection with supports of this character, lies in the fact that while the shelves are formed to permit of adjustment within a limited scope, there remains the requirement that a permanent attaching of the shelf must be had when being secured to the wall, and it is not always possible that the position of this permanent attachment is such as to permit of a ready placing of the shelf connection in position on the wall. In order to obviate these difficulties, and at the same time provide a sufficient support for the meter, we provide a support in the form of a stirrup which receives the meter, and connect the ends of the stirrup to suitable projecting portions adjustably carried by the street or service pipe, as most convenient, thereby placing the entire weight of the meter on that part of the meter connections in such manner as to practically make the meter self-supporting.

The principal object of our invention is, therefore, to provide a meter support in the form of a hanger which depends from a part of the meter connections, the portion to which the hanger is secured being movable and, if desired, adjustable in order to accurately position the meter with respect to the connections, and in such a manner as to take away the meter weight from such connections.

A further object of the invention is to provide a hanger-carrier movable on the street or service pipe, as the case may be, the carrier being formed with means to prevent rotative movement thereof.

A further object of the invention is to provide a positioning device by means of which the meter may be suspended in position away from the wall and positively held against a movement to carry the meter into contact with the wall.

A further object of the invention is to provide a hanger for this purpose formed preferably of wire bent into shape.

Other and further objects of the invention are to provide a hanger structure which is neat and attractive in appearance, durable in construction, easily applied or dismounted, and which can be manufactured at a low cost.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

In the accompanying drawings, in which similar reference characters indicate similar parts, in each of the views, Figure 1 is a front elevation of a meter connected to the street or service pipe, and shown as supported by means of a hanger carried by a carrier or supporting member provided with outwardly extending wings. Fig. 2 is a side elevation of the same. Fig. 3 is a top plan view of the same. Fig. 4 is an enlarged detail view of the carrier or support used in Figs. 1 to 3, and showing it as raised out of its normal supporting position. Fig. 5 is a horizontal sectional view taken on line 5—5 of Fig. 4. Fig. 6 is a detail view showing a movable carrier capable of being adjusted vertically. Fig. 7 is a horizontal sectional view taken on line 7—7 of Fig. 6. Fig. 8 is an elevation, partly in section of a stirrup formed to permit adjustment in width to accommodate for variations in size of meters. Fig. 9 is a similar view of a slightly modified form. Figs. 10 and 11 are cross-sectional views taken through the connector of the stirrup to show various ways in which the wires may be mounted.

10 designates a meter having the usual inlet and outlet pipes screw-threaded at their upper ends for connection with the service and street pipes in the usual manner of installation of meters, the connection being indicated at 11, and it may be either in the form of a lead pipe, or the ordinary iron pipe, the latter being indicated in the drawings, the connection having one end provided with a connector 12 for attachment to the meter pipe, and having at its other end a connector 13 adapted to have a screw-threaded connection with the street or service pipe, as the case may be, it being understood, of course, that the particular form of hanger support required, is used in connection with either the street or service pipe, but not both, the particular pipe best positioned for the purpose being selected. In the construction shown in Figs. 1 to 5 inclusive, the upper bead 13$^a$ of the connector 13 is cut away on opposite sides, as at 13$^b$ to provide parallel side faces which are practically tangent to the normal curvature of the connection, these faces extending to the meeting points of the normal peripheral lines and the tangent lines. In the form shown in Figs. 6 and 7 this cutting away of the head may be omitted, and reliance placed entirely on the adjusting screw to prevent rotative movement of the carrier presently described.

The hanger is preferably formed of stout wire, and, as shown in Figs. 1 to 3, is in the form of a stirrup which extends around from one side across the bottom and up the other side of the meter, this portion of the hanger being designated as 14, the free ends of the stirrup being bent inwardly as at 15, and adapted to extend through openings 16 in wings 17 secured to a carrier 35, said wings being inclined to provide an axis corresponding to the direction of inclination of the free ends 15 of the hanger, these wings projecting from opposite sides of the carrier, as indicated in the several views. The free ends 15 are screw-threaded and adapted to pass freely through the opening 16, being secured in adjusted position by suitable means, such as wingnuts 18 adapted to bear against the upper side of the wings.

As indicated in Figs. 2 and 3 the vertical portions of the stirrup are arranged so as to extend on opposite sides of the meter pipes, thereby causing the bottom of the stirrup to extend diagonally against the bottom of the meter, with the result that a tendency of the meter to tilt on the relatively small piece formed by the strand of wire, is eliminated. To further prevent tilting effect, the wings 17 are preferably arranged to extend in directions corresponding with a line extending from the front to the rear of the meter, as clearly indicated in Fig. 2, this result being obtained by a proper positioning of the faces 13$^b$ or by the adjustment of the carrier indicated in Figs. 6 and 7. If desired, the hanger may be formed to provide projections which extend beyond the plane of the meter, and which, when brought into contact with the wall, serve to position the meter away from and out of contact with the wall. These projections are formed by twisting the wire at a suitable point in the height of the vertical portion of the stirrup, and providing an elongated loop at the end of the twisted portion at 20 in the drawings. To provide the projecting portion in the vertical length of the stirrup, located in front of the meter pipe, (shown in full lines in Fig. 2) we provide a twisted portion of a length sufficient to be bent around the meter pipe, the amount of the twisting required for this side being greater than that required for the opposite side, due to the fact that there remains no requirement of passing the meter pipe in the latter case. The twisting and length of the loops are such that the rear end of the loops will extend to a plane approximately parallel to the plane of the rear face of the meter, thereby providing a support on each side of the meter against twisting movements and also retain the stirrup against movement relative to the meter.

The carrier 35 is in the form of a collar loosely fitting the street or service pipe (indicated as 25) and movable longitudinally thereof, and is provided with the wings 17 heretofore referred to. In the embodiment of the invention shown in Figs. 1 to 5, the collar is recessed at its lower end to provide parallel opposite faces 35$^a$ adapted to loosely fit over the faces 13$^b$ to form a lock against a rotative movement of the collar. In the form of carrier or support shown in Figs. 6 and 7 this recess is omitted, the rotative movement being prevented by a set-screw 36 extending through the collar and into contact with the pipe 20. By the use of the set-screw the carrier may be adjusted vertically on the pipe 20. If desired, the carrier shown in Figs. 1 to 5 may also be provided with a set-screw, as shown in dotted lines in Fig. 4.

As shown in Figs. 8 to 11, inclusive, the stirrup may be divided into two parts, indicated as 14$^a$ and 14$^b$, adapted to be adjustably connected together by a connector 25 into or through which the ends of the two wires 14$^a$ and 14$^b$ may be passed and secured by one or more set-screws 26, dependent upon the character of the connector. The arrangement of the wires in the connector is immaterial, it being readily understood that they may lie side by side, either in horizontal or vertical plane, or they may be positioned spaced apart, as indicated in Fig. 11. And, as indicated in Figs. 8 and 9, the wires may be seated as to place the connector 25 on a plane above the normal plane of the wires (causing the meter to rest on the connector), or the ends of the wires may be off-set to place the upper face of the connector 25 on or below the top plane of the main portion of the wires causing the meter to rest on the wires and connector or solely on the wires. Furthermore, if desired, the portions of the stirrup members adapted to be positioned in the connector 25, may be flattened, or the stirrup members may be formed flat or band-like, the upper ends being suitably formed to be removably secured to the wings 17.

From the above it will be readily understood that the meter is suspended centrally from the connections thereby placing it in balance, while the use of the rearwardly projecting portions or spacing elements 19 serve to position the meter out of contact with and spaced from the wall, so that dampness of the latter will not affect the meter, thereby preventing a rusting out of the meter.

While we have herein shown and described one embodiment of the present invention, it is to be understood that we do not limit ourselves to the precise construction shown therein, reserving the right to make any and all such modifications thereof as may fall within the scope of the invention as expressed in the accompanying claims.

Having thus described the invention, what we claim as new is:

1. The combination with meter connections and the street or service pipe to which the connections are secured, of means carried by the pipe and supported thereby at a point above and spaced from the top plane of a meter and movable longitudinally of the pipe for supporting the weight of the meter by suspension.

2. The combination with meter connections and the street or service pipe to which the connections are secured, of a hanger carried by the pipe and supported thereby at a point above and spaced from the top plane of a meter and movable longitudinally of the pipe for supporting the weight of the meter by suspension.

3. The combination with meter connections and the street or service pipe to which the connections are secured, of a hanger formed of wire carried by the pipe and supported thereby at a point above and spaced from the top plane of a meter and movable longitudinally of the pipe for supporting the weight of the meter by suspension.

4. The combination with meter connections and the street or service pipe to which the connections are secured, of a hanger support carried by and supported thereby at a point above and spaced from the top plane of a meter and movable longitudinally of the pipe, and a hanger for the meter, said hanger being in the form of a stirrup adapted to embrace the sides and bottom of the meter and having its free ends removably secured to the hanger support.

5. The combination with meter connections and the street or service pipe to which the connections are secured, of a hanger support carried by and supported thereby at a point above and spaced from the top plane of a meter and movable longitudinally of the pipe, and a hanger for the meter, said hanger being in the form of a stirrup adapted to embrace the sides and bottom of the meter and having its free ends removably and adjustably secured to the hanger support.

6. The combination with meter connections and the street or service pipe to which the connections are secured, of a hanger support carried by and movable longitudinally of the pipe, said support having means for preventing rotative movement thereof relative to the pipe, and a hanger for a meter, said hanger being in the form of a stirrup adapted to embrace the sides and bottom of the meter and having its free ends removably secured to the hanger support.

7. The combination with meter connections and the street or service pipe to which the connections are secured, of a hanger support carried by and movable longitudinally of the pipe, said support having means cooperating with the connection for preventing rotative movement of the support relative to the pipe, and a hanger for a meter, said hanger being in the form of a stirrup adapted to embrace the sides and bottom of the meter and having its free ends removably secured to the hanger support.

8. The combination with meter connections and the street or service pipe to which the connections are secured, of a hanger support carried by and movable longitudinally of the pipe, said support and a connection being complementally formed to provide interlocking engagement to retain the support against rotative movement on the pipe, and a hanger for a meter, said hanger being in the form of a stirrup adapted to embrace the sides and bottom of the meter and having its free ends removably secured to the hanger support.

9. The combination with meter connections and the street or service pipe to which the connections are secured, of a hanger carried by the pipe and supported thereby at a point above and spaced from the top plane of a meter and movable longitudinally thereof for supporting the weight of the meter, said hanger being adjustable to provide for variations in meter widths.

10. The combination with meter connections and the street or service pipe to which the connections are secured, of a collar carried by and movable longitudinally of said pipe, said collar having radially extending wings provided with faces inclined to the axis of the collar, and a hanger having parts removably carried by the respective wings.

11. The combination with meter connections and the street or service pipe to which the connections are secured, of a collar carried by and movable longitudinally of said pipe, said collar having radially extending wings provided with faces inclined to the axis of the collar, means for normally retaining said collar against rotation on the pipe, and a hanger having parts removably carried by the respective wings.

12. The combination with meter connections and the street or service pipe to which the connections are secured, of a collar carried by and movable longitudinally of said pipe, said collar having radially extending wings provided with faces inclined to the axis of the collar, said collar and connections being complementally formed to normally prevent a rotation of the collar on the pipe, and a hanger having parts removably carried by the respective wings.

In testimony whereof we have hereunto set our hands in presence of two subscribing witnesses.

PHILIP MUELLER.
ANTON C. SCHUERMANN.

Witnesses:
W. R. GUSTIN,
W. R. BIDDLE.

Copies of this patent may be obtained for five cents each, by addressing the "Commissioner of Patents, Washington, D. C."